INVENTOR.
NORMAN W. CHAPMAN

United States Patent Office 3,172,102
Patented Mar. 2, 1965

3,172,102
INTERROGATOR-RESPONDER SIGNALLING SYSTEM
Norman W. Chapman, Palo Alto, Calif., assignor to General Precision, Inc., Binghamton, N.Y., a corporation of Delaware
Filed Oct. 6, 1960, Ser. No. 60,873
5 Claims. (Cl. 343—6.5)

This invention relates to interrogator-responder signalling systems wherein an interrogation signal is received by a passive responder device which will detect a plurality of audio signals and by selective attenuation of the audio signals will generate a coded response signal peculiar to and identifiable with the responder device.

An application for United States Letters Patent entitled "Signalling System," Serial No. 739,909 filed June 4, 1958, now U.S. Patent No. 3,054,100, by Clarence S. Jones and assigned to the same assignee as the present invention, discloses an interrogator responder system capable of transmitting identifying data between the interrogator device and one or more passive responder devices. Each responder device provides a uniquely coded response signal to an interrogation station which is uniquely coded to identify the device. Each responder device may be small and light weight, and since it is passive no power source or power cells are needed. When such a responder device is carried by a vehicle such as a railroad car or a city bus, coded signals therefrom may identify the vehicle as it passes over or in close proximity to the antenna loop of an interrogator station, and a record of the vehicle's movements may be made at a central location such as a dispatcher's office. Signalling apparatus of this general type is marketed under the trademark "TRACER" by the assignee of this application.

The interrogation signals generated at one or more specific interrogation stations may comprise a carrier frequency together with a plurality of sideband frequencies. One system for generating such an interrogation signal disclosed in the patent application, Serial No. 739,909, supra, provides that a radio frequency carrier be modulated with a plurality of audio frequencies. Another system for generating such a signal is disclosed in a United States patent application entitled "Signalling System," Serial No. 15,597 filed March 17, 1960, now U.S. Patent No. 3,036,295, by Robert A. Kleist and assigned to the same assignee as the present application. This system provides a first radio frequency oscillator for generating a carrier frequency and a plurality of other similar radio frequency oscillators which directly generate the sideband frequencies, and the carrier frequency is combined with the sideband frequencies by means such as an operational amplifier—no modulation as such being required.

Each responder device may comprise an inductive coupling arrangement for receiving the interrogation signal, a detector circuit for developing audio signals from the sideband signals and means such as wave trap filters for eliminating selected ones of the audio signals. A transistor oscillator powered by a direct voltage obtained from detection of the carrier wave and modulated by those audio frequencies not eliminated by the filters provides the response signal. Shorting crystals may be provided for eliminating the sideband frequencies prior to detection thereof, and therefore, such a crystal arrangement is an alternative for the tuned filter traps. Both types of responder devices are disclosed in a co-pending patent application, Serial No. 8,723 entitled "Improved Responder Devices" filed February 15, 1960, now U.S. Patent No. 3,018,475, by Robert A. Kleist and Clarence S. Jones and assigned to the same assignee as the instant application.

Heretofore, an interrogator-responder signalling system used the wave trap filters or shorting crystals merely to attenuate the selected ones of the audio signals, and a receiver at the interrogator station detected which of the audio frequencies were present and which were absent to provide the digital code for identification of the responder device and of the vehicle carrying the responder device. One code which has been successfully used for identifying city buses is the 2-out-of-10 code, and in this system 10 audio frequencies are initially supplied (developed from sideband frequencies of the interrogator transmitter) and a selected 2 of the 10 are eliminated by wave traps. Such a code will provide 45 unique combinations. Another proposal provides a 2-out-of-15 code such that 15 audio frequencies are initially provided and a selected 2 of the frequencies are eliminated by wave traps. The 2-out-of-15 code provides 105 unique combinations for identification of vehicles. A 3-out-of-10 code has also been proposed, however, such an arrangement will complicate each responder device by requiring 3 rather than 2 filter traps.

It is an object of this invention to provide an improved interrogator-responder signalling system such that the number of unique coded combinations may be substantially increased without changing or increasing the complexity of the responder device used therein.

A further object of this invention is to provide an improved interrogator-responder signalling system which is compatible with the present signalling systems such that present systems may be expanded to provide increased capacity with no modifications to the present responder devices and with only a nominal increase in the apparatus provided at the interrogator stations.

Another object of this invention is to provide an improved means for detecting response signals whereby a determination is made which audio frequencies are attenuated by wave trap filters or the like, and a further determination is made as to the mode of signal attenuation whereby each filter trap is selectively tuned slightly higher than, equal to, or slightly lower than the audio frequency being attenuated.

Numerous other objects and advantages will be apparent throughout the progress of the specification which follows. The accompanying drawings illustrate a certain selected embodiment of the invention and the views therein are as follows.

Figure 1:
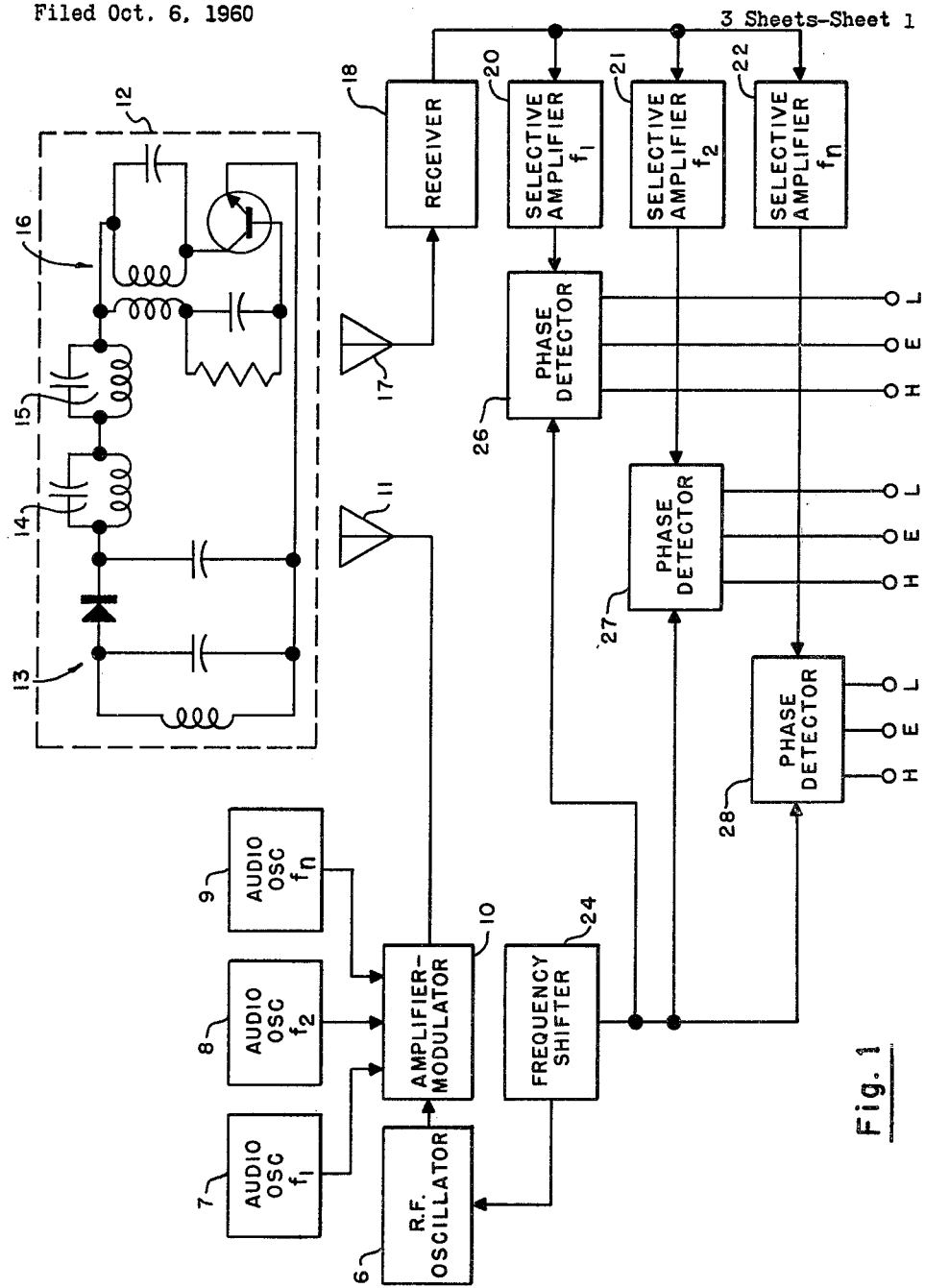
FIGURE 1 is a schematic diagram showing an interrogator responder signalling system using the teachings of this invention.

In an interrogator-responder system, a carrier signal is generated by a radio frequency oscillator 6, and is modulated by audio frequencies from oscillators 7, 8 and 9 by a modulating circuit 10. Thus, the interrogation signal comprises a carrier frequency combined with a plurality of sidebands of amplitude modulation, and is transmitted through an antenna 11 which may be a conductor loop placed between the rails of a railroad track for detection of railroad cars or embedded in the paving of a city street for the identification of city buses or the like. A responder device 12 is carried by the vehicle into close proximity with the transmitter loop 11. A detector circuit 13 therein detects the audio frequencies from the sideband frequencies. A pair of tuned filters 14 and 15 attenuates two selected ones of the audio frequencies, and passes the remaining audio frequencies to an oscillator 16 that generates a response signal modulated by those audio frequencies not attenuated by the filter traps 14 and 15. Another antenna loop 17 at the interrogator station picks up and passes the response signal to a receiver circuit 18 which detects the audio signals therefrom. Various selective amplifiers 20, 21 and 22 are tuned to pass the various audio signals, and identification information is provided by sensing which of the audio frequencies have been attenuated or "trapped out."

According to this invention, each filter 14 and 15 may be selectively tuned either slightly higher than, equal to or slightly lower than selected frequencies of the audio oscillators 7, 8 and 9 and a frequency shifting circuit 24 causes the radio frequency oscillator 6 to shift in frequency according to a low frequency which may be of the order of 10 cycles per second. The signal generated by the frequency shifting circuit 24 is passed to each of several phase detecting circuits 26, 27 and 28 and compared to the response output of the selective amplifiers 20, 21 and 22. Output signals are thence passed to respective high, equal or low (H, E or L) depending upon whether filter traps 14 and 15 of the responder devices 12 were tuned respectively to be slightly higher than, equal to, or slightly lower than the frequencies of the audio oscillators 7, 8 or 9.

Figure 2:
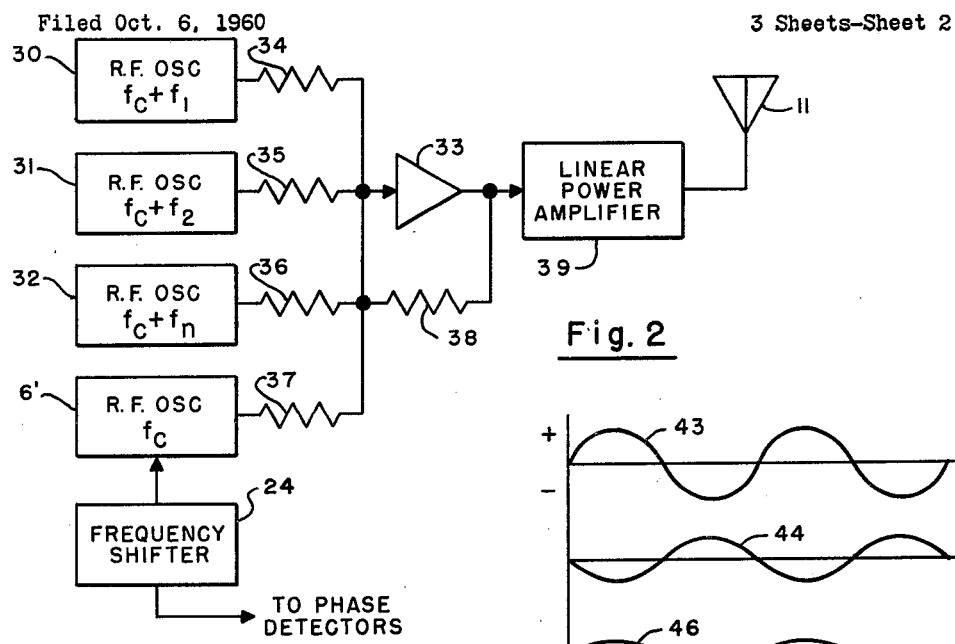
FIGURE 2 is a schematic diagram showing an alternative form of the interrogator-transmitter arrangement which may be substituted as a portion of FIGURE 1.

In the circuit of FIGURE 2 a first radio frequency oscillator 6' generates a carrier frequency signal and corresponds to the radio frequency oscillator 6 of FIGURE 1. A plurality of other radio frequency oscillators 30, 31 and 32 generate the sideband signals which may differ from the carrier frequency $f_c$ by the audio frequencies $f_1$, $f_2$ and $f_n$. An operational amplifier 33 of the type useful in analog computing circuits receives and combines the carrier frequency with the sideband frequencies which are developed by the oscillators 6', 30, 31 and 32 and passed by the coupling resistors 34, 35, 36 and 37. Another resistor 38 provides negative feedback for the operational amplifier 33. A power amplifying circuit 39 receives and passes the combined signals to the antenna loop 11. The frequency shifting circuit 24 is controllably coupled to the carrier frequency oscillator 6' and thereby causes the carrier frequency to be shifted at a relatively slow rate such as 10 cycles per second.

Since the sideband frequencies generated by the oscillators 30, 31 and 32 remain constant while the carrier frequency is shifted, the apparent audio frequencies modulated with the carrier will shift in unison as the carrier is shifted. Thus, the audio frequencies detected in the responder device 12 will increase and decrease synchronously at the 10 cycle rate.

Figure 4:
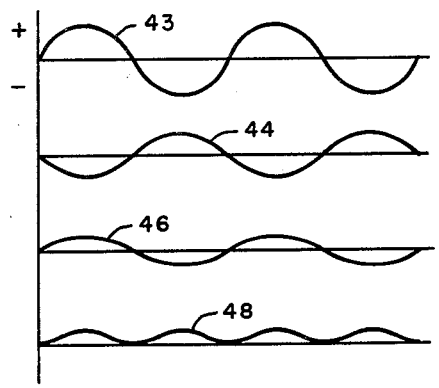
FIGURE 4 is a graphical representation illustrating a phase detection scheme for determining which of the three possible modes of operation is used by a selective filter.
Figure 3:
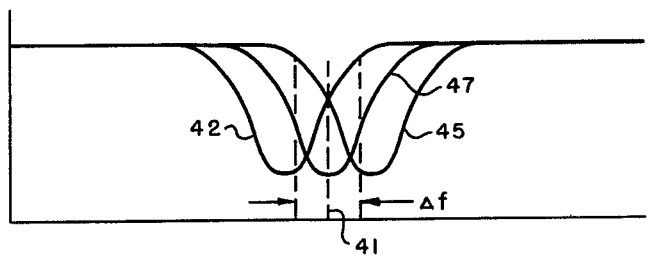
FIGURE 3 is a graphical representation of the signal rejection characteristics of the wave trap filters of this invention.

FIGURE 3 illustrates exemplary response curves for the tuned filters 14 and 15 of each responder device 12. While each of the filters will reject or attenuate certain frequencies about a centrally disposed line 41, it may be appreciated that the effect may be different depending upon whether the filter is tuned slightly lower than, equal to or slightly higher than the center frequency 41. Thus, the curve 42 represents the response characteristic of a filter which is tuned below the audio frequency 41. When the audio frequency is shifted and commences to increase, the attenuation effect of the filter becomes less since the operating range will be on the positive slope of the curve 42. Conversely, when the audio frequency decreases in value the attenuation effect of the filter increases. This characteristic is further illustrated by FIGURE 4 wherein the upper curve 43 represents the low frequency wobble or shifting (10 cycles per second) from the frequency shifting device 24. The attenuation effect of the filter is thus seen to be out of phase with the wobble frequency 43 resulting in a first response curve 44.

If a filter trap 14 or 15 were tuned slightly higher than the normal audio frequency, the response characteristic will appear as curve 45, FIGURE 3. In this case the attenuation of the filter increases as the audio frequency increases and decreases as the audio frequency decreases since the operating range is effectively on the negative slope of the curve 15. Thus, the attenuation effect of the filter will be in phase with the signal from the frequency shifting circuit 24 and a curve similar to 46, FIGURE 4, will be applied to the appropriate phase detector 26, 27 or 28.

If the filter trap 14 or 15 is tuned approximately equal to the respective audio frequency, the response characteristic would be similar to the centrally disposed curve 47, FIGURE 3. As the frequency is shifted over the operating range on each side of the center frequency, the variation in the filter response will be substantially less than in either of the other cases, and the attenuation may first increase and then decrease during a single increasing cycle of the phase shifting circuit thereby causing a double frequency response similar to a curve 48, FIGURE 4.

Figure 5:
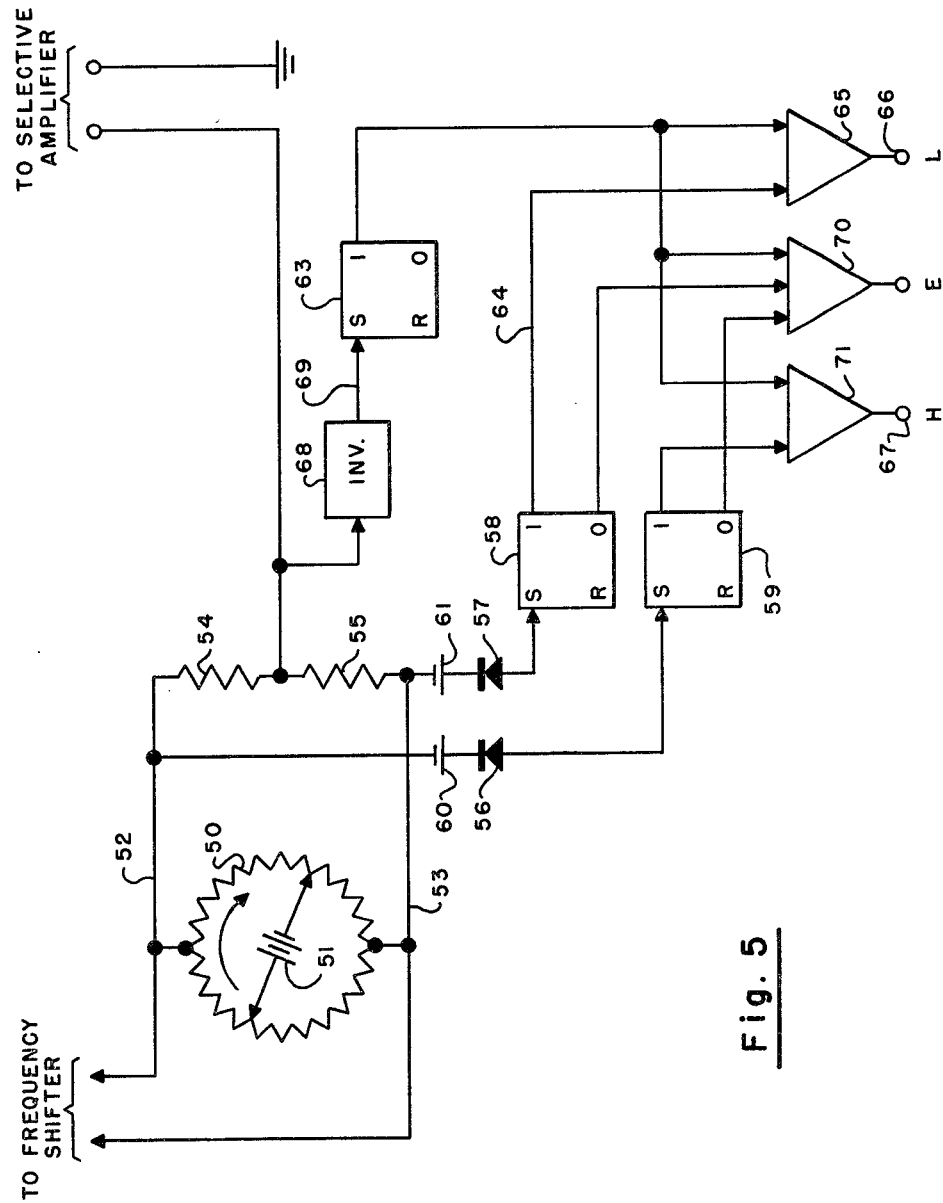
FIGURE 5 is a diagram of the phase detector circuits shown in block form in FIGURE 1.

FIGURE 5 illustrates the phase detecting apparatus shown as blocks 26, 27 and 28 in FIGURE 1. A low frequency alternating voltage may be generated by a means such as a circular potentiometer 50 to which a direct current voltage is applied through sliders which may rotate at 10 revolutions per second indicated in FIGURE 5 by a battery 51. The voltage thus generated on leads 52 and 53 may be sinusoidal having a frequency of 10 cycles per second, and will be floating or ungrounded. A pair of resistors 54 and 55 are serially connected across the 10 cycle voltage and provide a center tap or mid point to which the voltage detected from the selected amplifier 20, 21 or 22 may be applied. Since the voltage from the selective amplifier is referenced to ground, the voltage drop across a selected one of the resistors 54 and 55 will be additive to that of the selective amplifier while the voltage drop across the other resistor will be subtracted from that of the selective amplifier. Therefore, the voltage of one of the leads 52 or 53 may become positive and negative during alternate half cycles while the voltage of the other lead will remain substantially at ground potential. A pair of diodes 56 and 57 will pass the half cycle voltages from a selected one of the leads 52 or 53 to "set" an appropriate one of two flip-flop circuits 58 and 59. The diodes 56 and 57 may be back biased as indicated by cells 60 and 61 such that a substantial voltage from the selective amplifier is required over and above the voltage from the generator 50-51 to cause an appropriate one of the flip-flop circuits to be set.

At the beginning of each cycle the flip-flop circuits 58 and 59 are reset along with a further flip-flop circuit 63. If a selective amplifier and detector 20, 21 and 22 detects an audio frequency which is attenuated in the mode of the wave 44 (see FIGURE 4), the trigger 58 will be set by the combination of voltages from the selective amplifier and the 10 cycle generator 50-51, and a signal may be passed via a lead 64 through an AND circuit 65 to an output terminal 66 indicating that the selective filter 14 and 15 of the response block was tuned slightly lower than the audio frequency. Obviously, if the wave from the selective amplifier were similar to wave 46 (FIGURE 4), the addition of voltages by the resistors 54 and 55 would result in a voltage being passed by the diode 56 to set the flip-flop circuit 59, and to produce a signal at an output terminal 67 indicative of filter tuning which is higher than the audio frequency.

An inverter circuit 68 is coupled to the voltage detected by the selective amplifier and to provide a signal on a lead 69 when the corresponding audio signal is attenuated regardless of the mode of attenuation. The voltage from the lead 69 will set the trigger 63 to establish that a particular audio frequency has been attenuated. The trigger 63 is coupled to three AND gates 65, 70 and 71 and a signal will be passed to one of the three output terminals H, E or L whenever the trigger 63 is set. If the mode of attenuation is established as either higher than or lower than the audio frequency, the appropriate trigger 58 or 59 will be set to provide an output signal at terminals, H or L. On the other hand, if the mode of attenuation is similar to that of wave 48 (FIGURE 4) neither of the triggers 58 or 59 will be set and therefore an output signal will be passed through AND gate 70 to indicate that the tuning of the filter 14 or 15 is equal to the frequency of the audio wave.

Each of the selective amplifiers 20, 21 and 22 may be an amplifier of conventional type combined with a filter network such that the amplifier will have bandpass characteristics to pass the various audio frequencies $f_1$, $f_2$, and $f_n$. The selective amplifier arrangements may include a bandpass filter coupled to the input of a conventional amplifier, or alternatively, a conventional amplifier may be provided with a negative feedback loop including a band rejection filter. Such an arrangement is suggested in "Radio Engineers Handbook" by F. E. Terman, published in 1943 by the McGraw-Hill Book Company and specifically on page 919 with reference to FIGURE 23(d). A detector circuit included as a part of the selective amplifier will develop the output waves 44, 46 and 48.

Heretofore, interrogator responder signalling systems were capable of furnishing a single bit of coded information for each of the filter circuits 14 and 15 which were employed. Thus, in the 2-out-of-10 code the attenuation of a selected two frequencies out of the ten possible frequencies was sensed to provide 45 unique combinations. In the present invention additional coded information is provided by the three possible modes of attenuation which each of the filter traps 14 or 15 may apply to the audio signals. Thus, an addition to the information that a particular frequency has been attenuated a determination is made into mode of attenuation and the coding of the system is expanded ninefold. Thus, the former 2-out-of-10 code is expanded to provide 405 unique combinations for further identification of vehicles.

By the use of this invention, the equipment currently in operation is not rendered obsolete. By the addition of further responder devices selectively tuned higher and lower than the presently used audio frequencies, the further unique coded combinations are available to expand existing interrogator-responder signalling systems. Interrogator stations may be modified where necessary to sense the phase relationships of the attenuated signals for the additional unique combinations in newly provided responder devices, but previously installed interrogator stations without modification may continue to sense the original 45 unique combinations of an original 2-out-of-10 coded system. Thus, it may be appreciated that this invention provides a means for improving and expanding an existing system with new responder devices which will be generally compatible with the old system.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A signalling system comprising an interrogator station, and a responder device movable into spaced relation with the interrogator station, said interrogator station including a means for generating an interrogation signal having a carrier frequency and a plurality of sideband frequencies, said responder device including a means for detecting the interrogation signal and for developing a plurality of audio signals corresponding to the sideband frequencies, filter means for selectively attenuating at least one of the audio signals and for passing at least another audio signal, and means coupled to the filter means for generating a response signal with the audio signals modulated thereon, said filter means being selectively tuned to have a high, a low or an equal characteristic with respect to the audio frequency being attenuated, and receiving means at the interrogator station for detecting the response signal and reproducing the audio frequencies and operable to determine whether the filter means is tuned to have the high, the low or the equal characteristic.

2. A signalling system comprising an interrogator station and a responder device movable into spaced relation with the interrogator station, said interrogator station including a means for generating an interrogation signal having a carrier frequency and a plurality of sideband frequencies, said responder device including a means for detecting the interrogation signal and for developing a plurality of audio signals corresponding to the sideband frequencies, a filter means for attenuating selected ones of the audio signals and a means for passing the other audio signals, and means coupled to the filter means for generating a response signal with the audio signals modulated thereon, said interrogator station further including a means for shifting the carrier frequency of the interrogation signal, said filter means of the responder device being selectively tuned with respect to the respective audio frequencies to be attenuated and the mode of attenuation, and receiving means at the interrogator station for determining which of the audio frequencies are attenuated and further means coupled to the carrier frequency shifting means for determining the selective tuning mode of the filter means.

3. A signalling system comprising an interrogator station and a responder device movable into spaced relation with the interrogator station, said interrogator station including a means for generating an interrogation signal having a carrier frequency and a plurality of sideband frequencies, said responder device including a means for detecting the interrogation signal and for developing a plurality of audio signals corresponding to the sideband frequencies, filter means for attenuating selected ones of the audio signals and for passing the other audio signals, and means coupled to the filter means for generating a response signal with the audio signals modulated thereon, said interrogator station further including a means for shifting the carrier frequency of the interrogation signal, said filter means of the responder device being tuned to be selectively higher than, equal to or lower than the respective audio frequencies being attenuated, and receiving means at the interrogator station for determining which of the audio frequencies are attenuated, and further means coupled to the frequency shifting means and operable to detect the relative phase between the shifting signal and an amplitude modulation of the attenuated audio signals to determine whether the filter means is tuned high than, equal to or lower than the audio frequency.

4. A signalling system comprising an interrogator station and a responder device movable into spaced relation with the interrogator station, said interrogator station including a radio frequency oscillator for generating a carrier frequency, and a modulating circuit for modulating the carrier frequency with a plurality of audio frequencies to provide an interrogation signal, said responder device including a detecting circuit for detecting the plurality of audio frequencies, filter means for attenuating selected ones of the audio frequencies and for passing the other audio frequencies without attenuation, and a response oscillator for generating a response signal modulated with those audio frequencies passed by the filter means, said interrogator station further including a receiver for detecting the audio frequencies from the response signal, and a frequency shifting circuit coupled to the radio frequency oscillator and operable to shift the carrier frequency, whereby the frequencies of the audio signals appear to be shifted with respect to the carrier frequency said filter means of the response block being selectively tuned to be higher than, equal to or lower than the audio frequencies, whereby the attenuated audio frequencies are amplitude modulated with a modulation envelope wave which shifts in phase and phase detecting means coupled to the frequency shifting circuit and to the receiver for sensing the relative phase of the modulation envelope wave of the attenuated audio frequencies to determine whether the filters are tuned higher than, equal to or lower than the audio frequencies.

5. A signalling system comprising an interrogator station and a responder device movable into spaced relation with the interrogator station, said interrogator station including a first radio frequency oscillator for generating a carrier frequency, a plurality of further radio frequency oscillators for generating sideband frequencies, and amplifier means for combining and passing the carrier frequency and the sideband frequencies, said responder device including a detecting circuit for generating a plurality of audio frequencies corresponding to the sideband frequencies, filter means for attenuating selected ones of the audio frequencies and for passing the other audio frequencies, without attenuation and a response oscillator for generating a response signal modulated with those audio frequencies passed by the filter means, said interrogator station further including a receiver for detecting the audio frequencies from the response signal, and a frequency shifting circuit coupled to the first radio frequency oscillator and operable to shift the carrier frequency, whereby the frequencies of the audio signals appear to be shifted with respect to the carrier frequency said filter means of the response block being selectively tuned to be higher than, equal to or lower than the audio frequencies, whereby the attenuated audio frequencies are amplitude modulated with a modulation envelope wave which shifts in phase and phase detecting means coupled to the frequency shifting circuit and to the receiver for sensing the relative phase of the modulation envelope wave of the attenuated audio frequencies to determine whether the filters are tuned higher than, equal to or lower than the audio frequencies.

References Cited in the file of this patent
UNITED STATES PATENTS

| | | |
|---|---|---|
| 2,480,160 | Poylo | Aug. 30, 1940 |
| 2,535,162 | Rodgers | Dec. 26, 1950 |